(12) United States Patent
Thevenet et al.

(10) Patent No.: US 10,126,405 B2
(45) Date of Patent: Nov. 13, 2018

(54) RADIOFREQUENCY METHOD AND SYSTEM FOR DETERMINING, BY PAIRS OF SPACECRAFT, THE RELATIVE ANGULAR POSITION BETWEEN A PLURALITY OF REMOTE SPACECRAFT

(71) Applicant: THALES, Courbevoie (FR)

(72) Inventors: Jean-Baptiste Thevenet, Toulouse (FR); Christian Mehlen, Etoile sur Rhône (FR)

(73) Assignee: THALES, Courbevoie (FR)

(*) Notice: Subject to any disclaimer, the term of this patent is extended or adjusted under 35 U.S.C. 154(b) by 432 days.

(21) Appl. No.: 14/610,827

(22) Filed: Jan. 30, 2015

(65) Prior Publication Data
US 2015/0219747 A1 Aug. 6, 2015

(30) Foreign Application Priority Data
Jan. 31, 2014 (FR) .................... 14 00257

(51) Int. Cl.
| | |
|---|---|
| *B64G 1/10* | (2006.01) |
| *B64G 1/24* | (2006.01) |
| *B64G 1/36* | (2006.01) |
| *G01S 3/46* | (2006.01) |
| *G01S 5/14* | (2006.01) |

(Continued)

(52) U.S. Cl.
CPC ............. *G01S 5/0284* (2013.01); *B64G 1/10* (2013.01); *B64G 1/1085* (2013.01); *B64G 1/24* (2013.01);
(Continued)

(58) Field of Classification Search
CPC .... G01S 5/0284; G01S 5/0072; G01S 5/0247; G01S 3/46; G01S 5/14; G01S 13/605;
(Continued)

(56) References Cited

U.S. PATENT DOCUMENTS

| | | | | |
|---|---|---|---|---|
| 3,143,734 A | * | 8/1964 | Raabe ................. | G01S 13/605 342/113 |
| 3,290,677 A | * | 12/1966 | Jacob ................... | G01S 13/36 342/103 |

(Continued)

FOREIGN PATENT DOCUMENTS

| | | | | |
|---|---|---|---|---|
| EP | 1813957 A1 | * | 8/2007 | ............. B64F 1/1085 |
| EP | 1813957 A1 | * | 8/2007 | ............ B64G 1/1085 |

OTHER PUBLICATIONS

J.B. Thevenet, et al., "A Generic Radio-Frequency Subsystem for High-Altitude Formation-Flying Missions", 3rd International Symposium on Formation Flying, Missions and Technologies, Apr. 23, 2008, pp. 1-6, XP008173160.

(Continued)

*Primary Examiner* — Vladimir Magloire
*Assistant Examiner* — Nuzhat Pervin
(74) *Attorney, Agent, or Firm* — Baker & Hostetler LLP

(57) ABSTRACT

A system comprises: onboard a first craft, called host craft, a triplet of antennas comprising a transmitting and receiving antenna and two transmitting antennas, a transmission chain that can be successively coupled to each antenna of the triplet of antennas by a radiofrequency switch, a reception chain that can be coupled to the transmitting and receiving antenna, and a processing device intended to determine a relative angular position between, on the one hand, the host craft and, on the other hand, a plurality of spacecraft, called companion craft, from measurements of path differences performed and transmitted by the companion craft; onboard the companion craft, a transmitting and receiving antenna, a transmission chain and a reception chain coupled to the transmitting and receiving antenna and a measurement device intended to measure path differences between three (Continued)

signals originating from the three antennas of the triplet of antennas of the host craft.

8 Claims, 7 Drawing Sheets

(51) Int. Cl.
    *G01S 5/02*     (2010.01)
    *G01S 5/00*     (2006.01)
    *G05D 1/08*     (2006.01)

(52) U.S. Cl.
    CPC .......... *G01S 5/0072* (2013.01); *G01S 5/0247* (2013.01); *G05D 1/0883* (2013.01); *B64G 1/36* (2013.01); *G01S 3/46* (2013.01); *G01S 5/14* (2013.01)

(58) Field of Classification Search
    CPC .......... G01S 1/302; G01S 5/02; G01S 7/4026; G01S 11/10; G01S 19/29; G01S 19/14; G01S 13/82; G01S 19/55; G01S 1/14; B64G 1/10; B64G 1/1085; B64G 1/24; B64G 1/36; B64G 1/242; G05D 1/0883; G07C 5/008; H04B 7/18519; H01Q 13/22
    USPC .................. 342/355; 244/158.4, 158.6, 172.4
    See application file for complete search history.

(56) References Cited

U.S. PATENT DOCUMENTS

| | | | | |
|---|---|---|---|---|
| 3,953,856 A * | 4/1976 | Hammack | ............... | G01S 1/302 342/458 |
| 4,060,809 A * | 11/1977 | Baghdady | ................ | G01S 1/40 342/451 |
| 6,072,433 A * | 6/2000 | Young | ................... | G01S 5/0072 342/357.48 |
| 6,140,958 A * | 10/2000 | Johnson | ................ | G01S 5/0027 342/357.31 |
| 6,866,232 B1 * | 3/2005 | Finney | ................... | B64G 1/242 244/172.4 |
| 7,388,807 B2 * | 6/2008 | Pillon | ................... | G01S 7/4026 367/13 |
| 8,265,808 B2 * | 9/2012 | Garrec | .................... | G01S 11/10 342/42 |
| 8,463,467 B2 * | 6/2013 | Mehlen | ................ | B64G 1/1085 701/13 |
| 8,886,373 B2 * | 11/2014 | Garrec | .................... | G01S 13/82 701/17 |
| 9,065,530 B2 * | 6/2015 | Aymes | ............... | H04B 7/18519 |
| 9,263,801 B2 * | 2/2016 | Lenormand | ............ | H01Q 13/22 |
| 9,348,011 B2 * | 5/2016 | Cornic | ...................... | G01S 1/14 |
| 2009/0055038 A1 * | 2/2009 | Garrec | .................... | G01S 11/10 701/17 |
| 2010/0063733 A1 * | 3/2010 | Yunck | ................. | G01S 13/9023 701/469 |
| 2013/0311002 A1 * | 11/2013 | Isaac | ...................... | G07C 5/008 701/2 |
| 2014/0091966 A1 * | 4/2014 | Martin | .................... | G01S 19/14 342/357.68 |
| 2015/0015436 A1 * | 1/2015 | Broquet | ................. | G01S 19/55 342/357.38 |

OTHER PUBLICATIONS

Pablo Colmenarejo, et al., "Low-cost Relative Navigation Sensing: GNSS-Like Devices Hosted on Deployed Tethers", ACTA Astronautica, Oct. 1, 2006, pp. 873-881, vol. 59, No. 8-11, Pergamon Press, Elmsford, GB.

* cited by examiner

RADIOFREQUENCY METHOD AND SYSTEM FOR DETERMINING, BY PAIRS OF SPACECRAFT, THE RELATIVE ANGULAR POSITION BETWEEN A PLURALITY OF REMOTE SPACECRAFT

CROSS-REFERENCE TO RELATED APPLICATION

This application claims priority to foreign French patent application No. FR 1400257, filed on Jan. 31, 2014, the disclosure of which is incorporated by reference in its entirety.

FIELD OF THE INVENTION

The present invention relates to a radiofrequency method and system for determining, by pairs of spacecraft, the relative angular position between a plurality of remote spacecraft. It applies to any navigation mission which requires an accurate determination, in real time, of the relative position between a plurality of spacecraft, and in particular to the field of satellites flying in formation, or craft in docking maneuver or in meeting maneuver. Each spacecraft can be of any type such as, for example, a satellite, a space station, a space shuttle or an orbiting craft.

BACKGROUND

It is known practice from the document EP 1 813 957 to monitor the relative position between two spacecraft by analyzing bifrequency navigation signals received by each craft, the use of bifrequency signals making it possible to obtain unambiguous angular measurements. This document describes performing measurements simultaneously on the two spacecraft, for example two satellites, the measurements performed by each craft being obtained from the reception of bifrequency signals transmitted by the other craft. However, this measurement method requires the satellites to be previously aligned and each satellite to be equipped with a plurality of different reception chains working simultaneously, which raises calibration problems. In effect, the different measurement chains are not perfectly identical to one another and the signal propagation times can vary because of power and temperature variations between the different measurement chains, which leads to measurement errors and inaccurate positioning. To neutralize the inter-channel biases and limit the measurement errors, a dynamic calibration chain comprising an internal measurement loop, called self-calibration loop, has been introduced, which increases the complexity and the bulk of the measurement system. Furthermore, to lift the carrier phase ambiguity on the measurement of path difference of the received signals, this method requires a prior alignment of the satellites via a bifrequency signal, a first rotation of the spacecraft about the axis of the antenna to reduce the carrier cycle ambiguity using a star sensor and a reverse rotation of the craft to return to the initial position. The complexity of the corresponding overall architecture results in a weight, an energy consumption and a volume that are difficult to reconcile with the resources of certain operational platforms.

SUMMARY OF THE INVENTION

The aim of the invention is to remedy the drawbacks of the known solutions and provide a method and a system for determining the relative position between two remote spacecraft that is more simple, does not require any bifrequency measurement chain and makes it possible to obtain a better angular measurement accuracy while doing away with the problems of measurement ambiguity.

For this, the invention relates to a method for determining, by pairs of spacecraft, the relative angular position between a plurality of remote spacecraft, consisting:

in sequentially transmitting at least three radiofrequency signals from a triplet of antennas mounted on a first face of a first spacecraft, called host craft, the triplet of antennas comprising a main transmitting and receiving antenna and two secondary transmitting antennas, in receiving the three radiofrequency signals on a transmitting and receiving antenna of at least one second spacecraft, called companion craft, in measuring, onboard each companion craft, path differences between the signal from the main antenna and the signals from each of the two secondary antennas, then in transmitting, by each companion craft to the host craft, a radiofrequency signal containing the measurements carried out, in receiving and in processing, onboard the host craft, the radiofrequency signal containing the measurements transmitted by each companion craft and in deducing therefrom the relative angular position of each companion craft in a reference frame linked to the host craft.

Advantageously, all the radiofrequency signals are transmitted or received sequentially by the different antennas of the spacecraft, via a two-way inter-craft location and communication radiofrequency link, according to a TDMA frame comprising a plurality of successive time windows respectively allocated to each antenna of the host craft and to each antenna of the companion craft for the transmission or the reception of radiofrequency signals.

Advantageously, all the radiofrequency signals transmitted or received are modulated by a carrier having an identical frequency F1.

Advantageously, the method further comprises an additional step intended to reduce a carrier phase ambiguity, consisting:

without prior alignment of the two spacecraft, in performing a first rotation of the host craft about an axis Z parallel to a pointing axis of the antennas of the triplet, the first rotation being performed in a first direction and having a rotation angle of any predetermined value, then in acquiring measurements of path differences, at different successive measurement instants, throughout the duration of the rotation and in computing variations of path differences between the successive measurement instants, at the same successive measurement instants, in measuring variations of inertial attitude of the host craft, from the measured variations of path differences and variations of inertial attitude, deducing therefrom, for each pair of spacecraft, an estimation of the relative angular position between the spacecraft, then in aligning, for each pair, the host and companion spacecraft and in performing a second rotation of the host craft about the axis Z, the second rotation being performed in a second direction opposite the first direction and having a rotation angle of a value almost identical to the first rotation and in performing, for each pair of spacecraft, a new unambiguous measurement of the relative angular position between the spacecraft.

The invention relates also to a system for determining, by pairs of spacecraft, the relative angular position between two remote spacecraft for the implementation of the method, the system comprising at least one first spacecraft, called host craft, and one second spacecraft, called companion craft. The host craft comprises at least one triplet of antennas mounted on a first face, the triplet of antennas comprising a main transmitting and receiving antenna and two secondary transmitting antennas, a transmission chain that can be successively coupled, in transmission, to each antenna of the triplet of antennas and a reception chain that can be coupled, in reception, to the main antenna, a radiofrequency switch suitable for sequentially selecting the different antennas of the triplet and a processing device intended to determine a relative angular position between the host craft and the companion craft from measurements of path differences transmitted by the companion craft. The companion craft comprises at least one transmitting and receiving antenna placed on a first face, a transmission chain and a reception chain respectively coupled to the transmitting and receiving antenna and a measurement device intended to measure path differences between a radiofrequency signal received from the main antenna and radiofrequency signals received from each of the two secondary antennas of the triplet of antennas of the host craft.

Advantageously, the host craft further comprises a device for measuring attitude variations of the host craft.

Advantageously, each host and companion spacecraft further comprises a second transmitting and receiving antenna placed on a second face opposite the first face of the corresponding spacecraft.

Advantageously, each host and companion spacecraft comprises a triplet of antennas, a processing device and a device for measuring path differences.

Advantageously, the system further comprises, onboard each host and companion spacecraft, means for measuring the power level of the signals received by each receiving antenna and means for selecting the receiving antenna that has the greatest power level.

BRIEF DESCRIPTION OF THE DRAWINGS

Other particular features and advantages of the invention will become clearly apparent from the rest of the description given as a purely illustrative and nonlimiting example, with reference to the attached schematic drawings which represent.

DETAILED DESCRIPTION

According to the invention, the measurement of the relative position between two remote spacecraft 10, 20 is performed onboard one of the two spacecraft, called host craft 10, the other spacecraft being called companion craft 20. "Relative angular position" should be understood to mean the two estimations of the azimuth and elevation angles of each companion craft in a reference frame linked to the host craft, the reference frame being defined by a triplet of antennas mounted on a face of the host craft. In the case where there are a plurality of companion craft in the formation, the method of the invention applies to each pair of spacecraft comprising a host craft and a companion craft.

Figure 1:
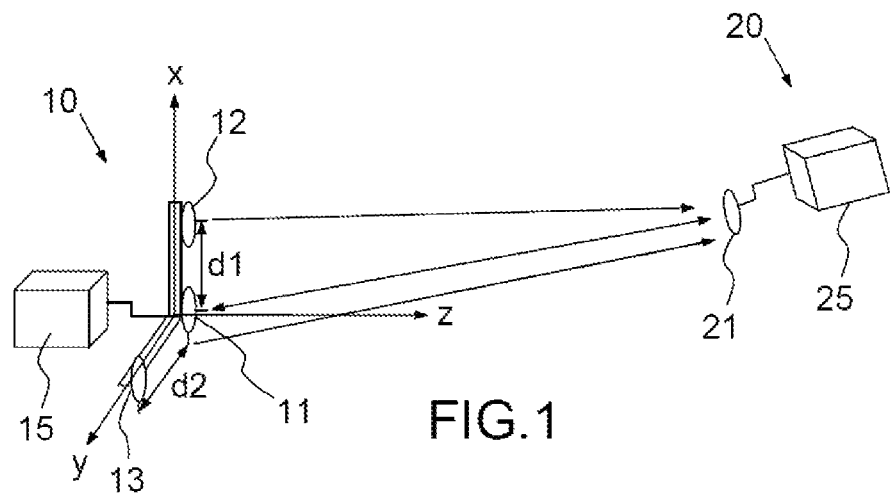
FIG. 1: a diagram of a set of two remote spacecraft, respectively called host craft and companion craft, according to the invention.
Figure 2:
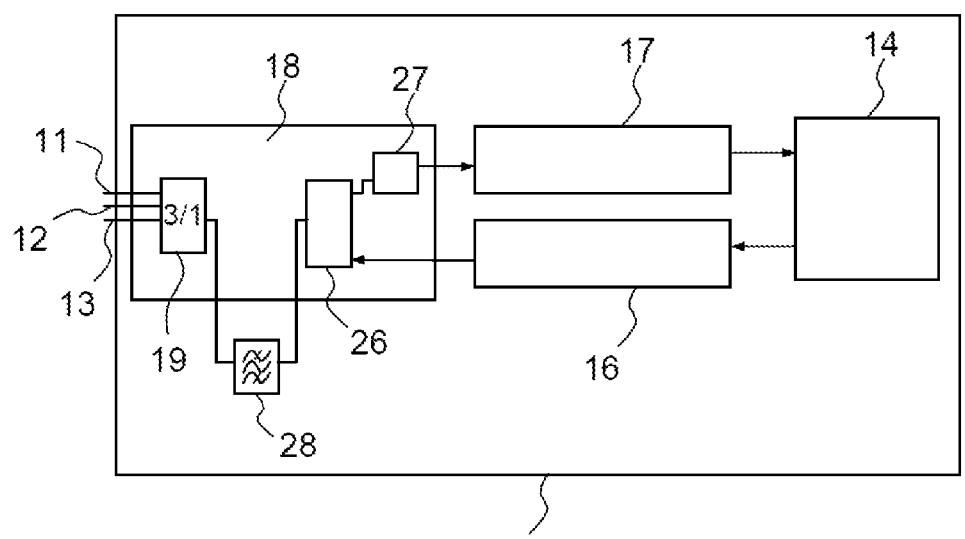
FIG. 2: a block diagram of an exemplary architecture of a radiofrequency terminal onboard a host craft, according to the invention.
Figure 3:
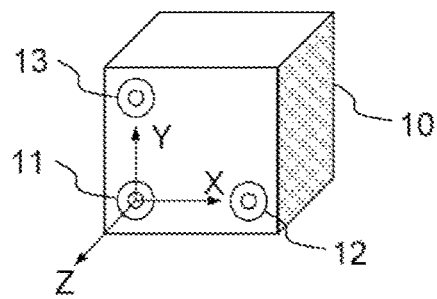
FIG. 3: an example of positioning of three antennas of a triplet, on a face of a host craft, according to the invention.

As represented in the schematic example of FIG. 1, the host craft 10 and the companion craft 20 each comprise a radiofrequency terminal 15, 25 connected to antennas. To estimate the angular position of at least one remote companion craft in a reference frame linked to the host craft, as represented in the diagram of FIG. 2, the radiofrequency terminal 15 of the host craft has to have a processing device 14, a transmission chain 16, a reception chain 17 and at least one set of three antennas comprising a main Rx/Tx antenna 11 operating in transmission and reception and two secondary Rx antennas 12, 13 operating in transmission. The three antennas 11, 12, 13 are positioned at three points selected on one of the faces of the host craft 10, the distances d1, d2, separating the main Rx/Tx antenna 11 from the two secondary Rx antennas 12, 13 being predetermined. The three antennas thus form a triplet of antennas, the bases of the antennas 11 and 12 being aligned along a first direction X and the bases of the antennas 11 and 13 being aligned along a second direction Y. The transmission chain and the reception chain operate at one and the same predetermined frequency F1. FIG. 3 illustrates a nonlimiting example of positioning of the three antennas of a triplet of antennas. In this example, the base of the main antenna 11 and the bases of the antennas 12 and 13 are respectively aligned along two directions X, Y of the face of the host craft and their pointing direction is oriented along an axis Z normal to the face. The two directions X and Y can be mutually orthogonal but this is not essential. However, it is preferable to approximate orthogonality of the bases of the antennas, for example to within 20°, to obtain a better uniformity of the performance levels in the three dimensions of space. On the other hand, it is vitally important for the three antennas of the triplet to be oriented in an identical pointing direction. The host craft 10 can further comprise an additional transmitting and receiving antenna placed on a second face of the host craft, opposite the first face where the triplet of antennas is located.

The three antennas of the triplet of the host craft, and possibly the additional transmitting/receiving antenna, are sequentially linked, one after the other, in transmission, to the transmission chain 16. The transmitting/receiving antenna of the triplet of antennas and/or the additional transmitting/receiving antenna of the host craft are sequentially linked, in reception, to the reception chain 17. The host craft comprises a routing device 18 including a radiofrequency switching means 19 ensuring the sequential selection of the antennas of the triplet in accordance with a TDMA frame defining the succession of the periods of transmission and reception of the signals for each of the antennas and a radiofrequency filter 26 ensuring the routing of the transmission signals and of the reception signals to the transmission chain or to the reception chain. The radiofrequency switching means 19 makes it possible to multiplex the radiofrequency signals between the transmission chain and the reception chain and between the different antennas. The radiofrequency switching means 19 is linked to the transmission chain and to the reception chain via an input/output filter 28 connected to the routing filter 26 of the transmission signals and of the reception signals. Furthermore, an attenuator 27 is connected between the routing filter 26 for the transmission and reception signals and the reception chain 17.

Figure 4:
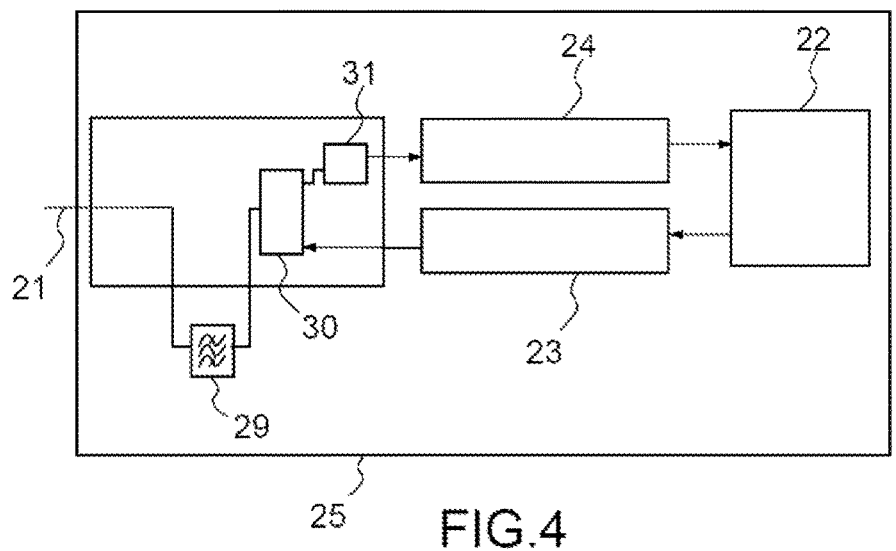
FIG. 4: a block diagram of an exemplary architecture of a radiofrequency terminal onboard a companion craft, according to the invention.

As represented in FIG. 4, the radiofrequency terminal of each companion craft 20 must include a measurement device 22, a transmission chain 23, a reception chain 24 and an antenna 21 operating in transmission Tx and in reception Rx. The transmission chain and the reception chain operate at the same frequency F1 as the transmission and reception chains of the host craft. The companion craft further comprises an input/output filter 29 connected to a routing filter 30 for the transmission signals and the reception signals and an attenuator 31 connected between the routing filter 30 for the transmission and reception signals and the reception chain 24.

According to the invention, the host craft 10 transmits radiofrequency signals toward the companion craft 20 over a two-way inter-craft location and communication radiofrequency link 33. The signals transmitted by each host craft or by each companion craft comprise a carrier of frequency F1 modulated on the one hand by a pseudo-random code making it possible to obtain a pseudo-distance measurement and, on the other hand, by data. The radiofrequency terminals 15, 25 of the host craft and of each companion craft comprise internal clocks that are not represented, used to generate the carrier frequency F1 and to sequence the pseudo-random code. The clocks also supply clock signals necessary for controlling the transmission and reception of the radiofrequency signals. The pseudo-random code and a specific field containing local time information added to the data transmitted by one of the spacecraft, host or companion, and received by another spacecraft, make it possible for all the spacecraft to be mutually synchronized and to synchronize the periods of transmission and reception between the different spacecraft. According to the invention, the radiofrequency signals are transmitted sequentially in frame form, according to a TDMA (time division multiple access) transmission mode. Each antenna of the host craft and of the companion craft is assigned a specific time window in the frame, the time window being dedicated to the transmission of radiofrequency signals and, for the antennas also operating in reception, is also assigned a specific time window dedicated to the reception of radiofrequency signals. The isolation between the transmitted signals and the received signals is provided by virtue of the different time windows assigned to transmission and to reception in the TDMA frame. This makes it possible to use a single transmission and reception frequency F1 to be able to perform the position measurements and install a single transmission and reception chain onboard each craft.

Figure 5A:
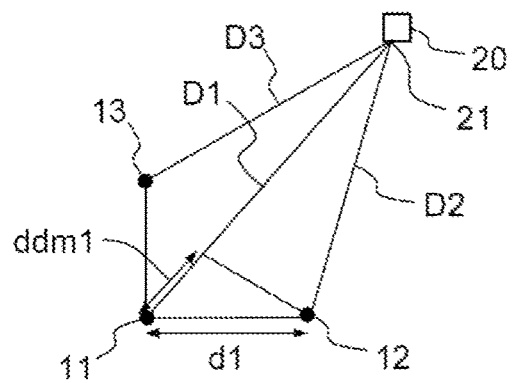
FIGS. 5a, 5b: two diagrams illustrating the path difference between two signals transmitted by two main and secondary antennas of a triplet of antennas of a host craft and the relative angular positions of two corresponding host and companion craft, according to the invention.
Figure 5B:
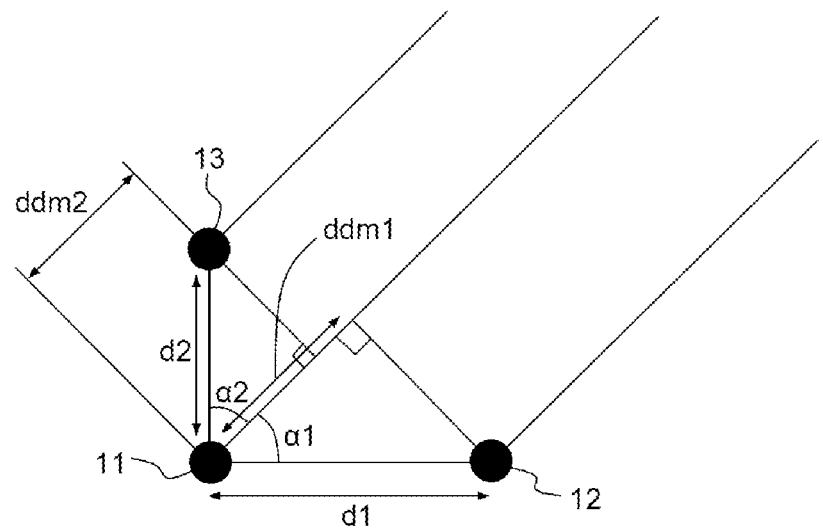
Figure 5C:
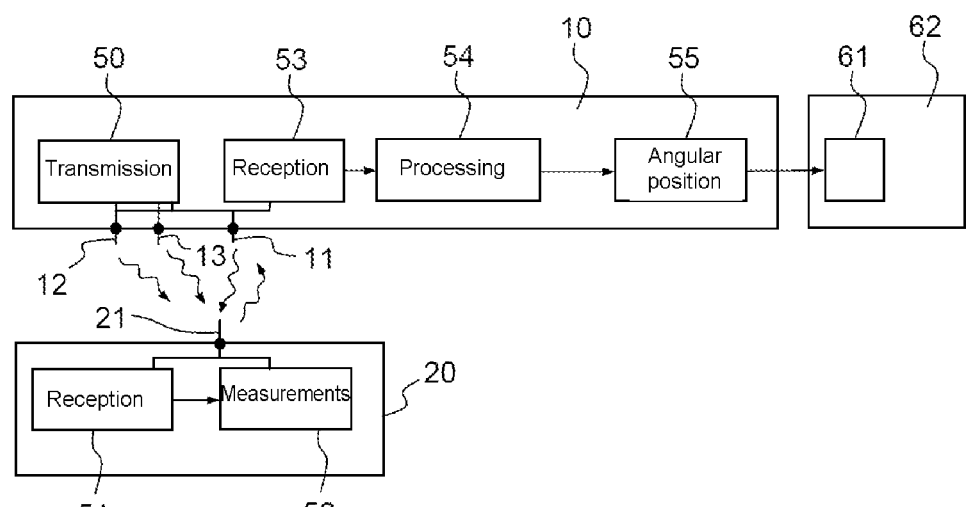
FIG. 5c: a block diagram illustrating the method for measuring the relative angular position between two spacecraft, host and companion, according to the invention.

As represented in FIG. 5c, in a first step, radiofrequency signals are transmitted 50, sequentially in dedicated time windows of the TDMA frame, by each of the three antennas 11, 12, 13 of the host craft 10. The companion craft 20 successively receives 51, on its antenna 21, in a specific time window dedicated to reception, the different signals transmitted by each of the three antennas of the host craft 10. The received signals are transmitted to the measurement device 22 which measures 52 the propagation time of each received signal originating from each of the three antennas 11, 12, 13 of the host craft 10 and deduces therefrom path differences ddm1, ddm2 between the path traveled by the signal originating from the main Rx/Tx antenna 11 and the path traveled by the signals originating from each of the two secondary Tx 12 and Tx 13 antennas of the host craft.

FIGS. 5a, 5b illustrate the principle of measuring the path difference ddm1, respectively ddm2, between the signal originating from the main antenna 11 and the signal originating from a secondary antenna 12, respectively 13, the two antennas, main and secondary, being spaced apart by a distance d1, respectively d2. When the host and companion craft are sufficiently distant from one another relative to the distance between the main antenna and each secondary antenna, the signals sent by the different antennas of the host craft appear parallel as is shown in the enlarged partial diagram of FIG. 5b. The path difference ddm1 is the path difference D1-D2 which exists between the signals originating from the two main 11 and secondary 12 antennas of the host craft and received by the companion craft. Similarly, the path difference ddm2 is the path difference D1-D3 which exists between the signals originating from the two main 11 and secondary 13 antennas. Each path difference ddm1, ddm2, expressed in meters, is directly proportional to the propagation time difference between the signals transmitted by the main antenna and the signals transmitted by each of the two secondary antennas of the host craft and received by the companion craft, the proportionality factor being the light propagation speed in a vacuum. Each path difference ddm1, ddm2 depends on the distance d1 separating the two antennas 11, 12, respectively on the distance d2 separating the two antennas 11, 13, of the host craft. Each path difference is determined by the measurement device 22 and corresponds to the difference between the pseudo-distance measurements on the phase of the carrier between the signals emanating from the two antennas 11 and 12, and respectively 11 and 13. As all the measurement signals are obtained by a single reception chain onboard the companion craft 20, they all follow the same electrical path. This makes it possible to dispense with the use of calibration means and eliminate the measurement errors linked to the use of a plurality of different measurement chains. Furthermore, the subtraction made to obtain the path difference measurements cancels all the possible errors linked to the measurement chain, apart from the errors linked to the antennas and to the switching means which are considered to be stable and calibrated on the ground prior to the mission.

In a second step, the antenna 21 retransmits, via the inter-craft radiofrequency location and communication link 33, the path differences ddm1, ddm2 measured by the companion craft 20 in a message, to the host craft 10, the message being transmitted in the time window allocated for the transmission from the companion craft 20. The message comprises, in addition to the transmission of the path difference measurements, other data in the form of a global navigation signal. In practice, the message must include the specific TDMA synchronization field, and data concerning the selection of the receiving antenna, when there are more than one receiving antennas, on the basis of power measurements for example. Furthermore, additional measurements such as the pseudo-distance measurements, can be exchanged between the transmitting/receiving antennas of two spacecraft, for example for the computation of the inter-craft distance and of the inter-clock time bias. Finally, the message can be complemented with measurement status and validity data.

In a third step, the path difference measurements retransmitted by the companion craft 20 are received 53 by the main Rx/Tx antenna 11 of the host craft 10 then processed 54 by the processing device 14. The processing 54 consists, based on the path difference measurements and on the knowledge of the position of the antennas of the host craft in a reference frame linked to the triplet of antennas 11, 12, 13, in estimating, in quasi-real time, two elevation and azimuth angles defining the angular position of the companion craft in a reference frame linked to the triplet of antennas 11, 12, 13 of the host craft. Each path difference ddm1, ddm2 is equal to the product of the distance d1 separating the two antennas 11, 12, respectively of the distance d2 separating the two antennas 11, 13, and the cosine of the angle $\alpha 1$, respectively $\alpha 2$, between the direction of arrival of the signals, called line-of-sight LoS and the direction of alignment of the two antennas 11, 12, respectively 11, 13, on the face of the host craft. The two path difference measurements ddm1, ddm2 therefore make it possible to obtain two angles $\alpha 1$, $\alpha 2$ of arrival of the signals relative to the reference frame linked to the antennas and deduce therefrom the angular position 55 of the companion craft 20 relative to the host craft 10.

Figure 6:
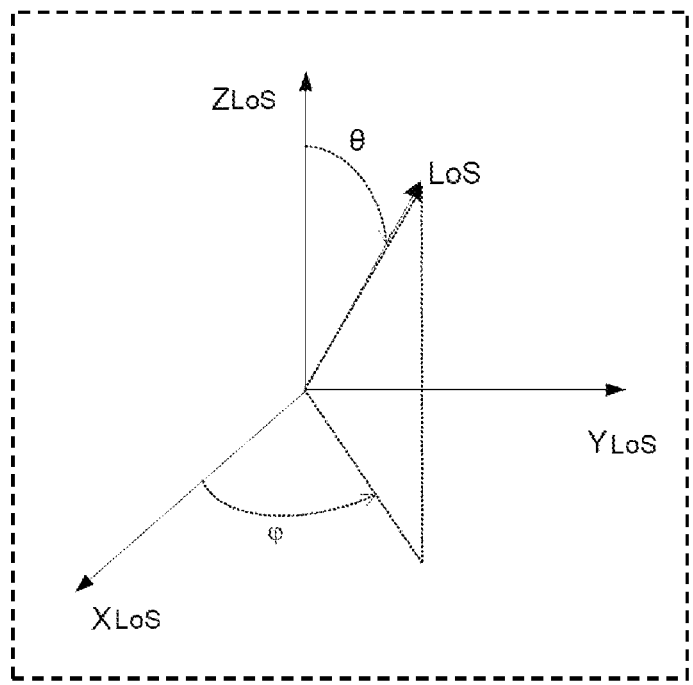
FIG. 6: a diagram illustrating the elevation and azimuth angles defining the relative angular position of a companion craft in a reference frame X, Y, Z linked to the host craft, according to the invention.

FIG. 6 illustrates the elevation and azimuth angles defining the angular position of a spacecraft in a reference frame X, Y, Z linked to the host craft, the line-of-sight vector LoS is the unitary vector parallel to the vector linking the reference frames of the two host and companion craft, the relative position of which must be determined. In the case where the reference frame X, Y, Z corresponds to the reference frame linked to the antennas, the components of the LoS vector in the directions X and Y are first computed by a single division of the path differences ddm1, ddm2 by the length of the corresponding antenna base D1 or D2. The latter component in the direction Z is obtained by using the fact that the LoS vector is unitary. The azimuth angle $\varphi$ is then obtained by an arc-tangent type operation with four quadrants on the pair of directions Y, X. The elevation angle $\theta$ is obtained by an operation of arc-cosine type on the component in the direction Z.

Finally, if the clocks are not a priori synchronized between the host and companion craft, it may be necessary to perform a time transfer between the two spacecraft. For this, a well-known technique of "two-way" type can be used, consisting in combining the go and return pseudo-distance measurements between a pair of transmitting/receiving antennas to know the time difference between the clocks of the two spacecraft in order to be able to restore the angular measurement in the local time of the host craft, instead of that of the companion craft in which the raw measurements are performed. Furthermore, the processing device 14 can also determine the inter-craft distance from the same pseudo-distance measurements.

The angular position obtained can then be supplied to a navigation filter 61 incorporated in a guidance, navigation and control module GNC 62 of a central computer onboard the host craft, not represented, for it to be able to compute, in real time, navigation maneuvers to be performed to correct its position or orientation relative to the companion craft if necessary. The two host and companion craft are considered to be aligned when the azimuth $\varphi$ and elevation $\theta$ angles are zero.

Because of the need to exchange the data between the spacecraft, the asynchronism of the clocks of the spacecraft and the software tasks performed at low rate, typically 1 Hz, there is a latency time of one to two seconds between the instant when the path difference measurement is performed by the companion craft, and the instant when the angular position is available to the host craft for the transmission to the GNC 62. In other words, the GNC 62 is supplied with a position that is very accurate but applicable to a past date. This is not a problem because the angular measurements are dated accurately and accompanied by angular speed measurements, obtained by measuring the variation of the inter-antenna carrier phase differences, which allows for an accurate re-synchronization of the measurements performed, at the current time.

Independently of the latency time, the path differences measured are a priori ambiguous when the distance separating the main antenna from each of the two secondary antennas is greater than the half-wavelength of the transmitted signal, which can correspond to a typical case, notably in S band, because the angular accuracy is better when the distance which separates the antennas increases. The measurements therefore contain an unknown whole number of carrier phase cycles which can be different for each of the pairs of main 11 and secondary 12, 13 antennas of the host craft, according to the relative angular position of the craft and the length d1, d2, of the antenna bases. In the absence of specific processing, the computations of the azimuth and elevation angles are consequently errored.

Figure 7A:
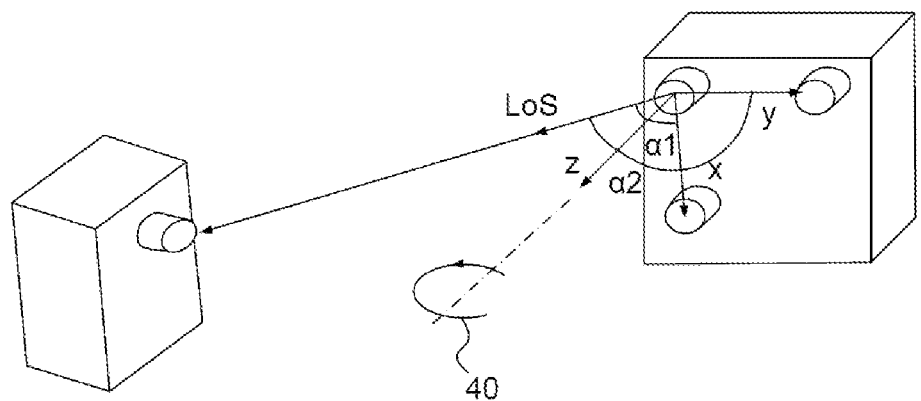
FIG. 7a: an example illustrating a rotation of a host craft intended to make it possible to reduce a carrier phase ambiguity on the path difference measurements, according to the invention.
Figure 7B:
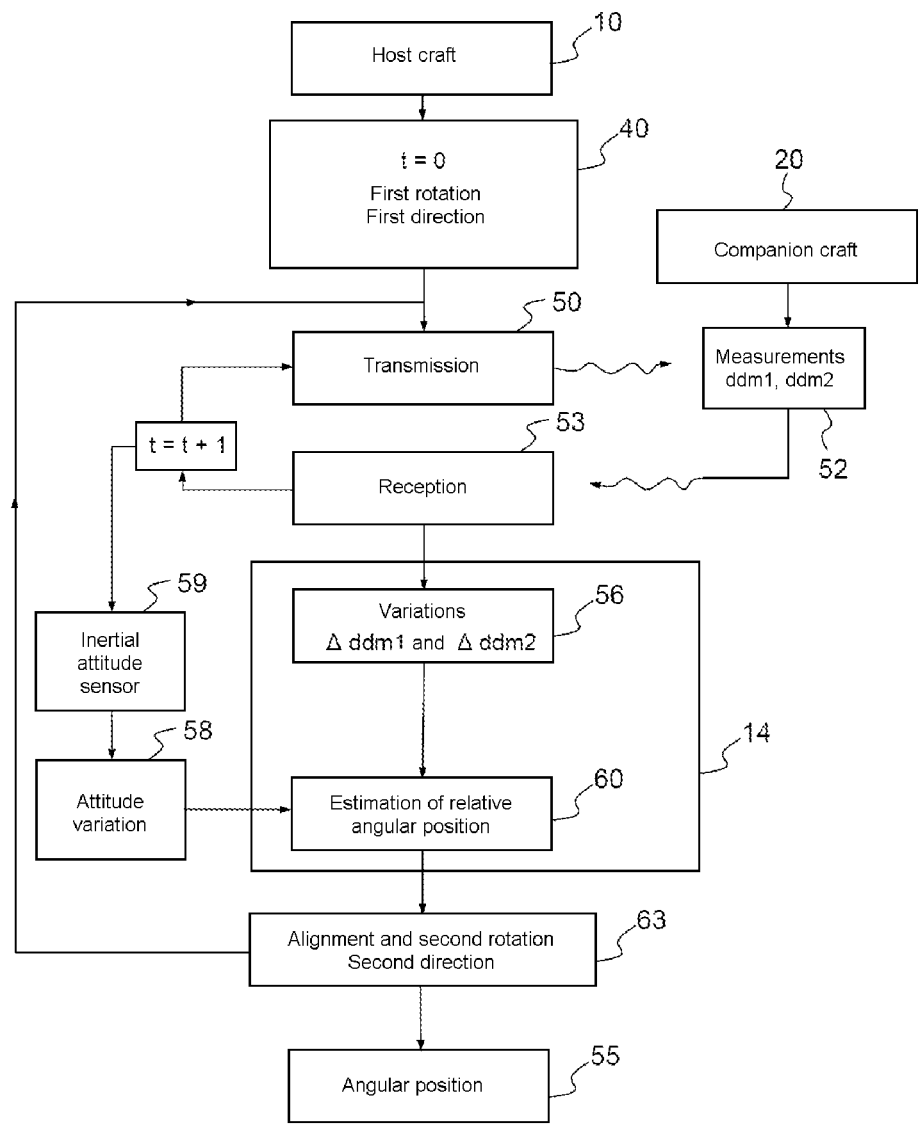
FIG. 7b: a flow diagram illustrating the steps in reducing carrier phase ambiguity, according to the invention.

To reduce the carrier phase ambiguity on the path difference measurements, the invention further comprises a preliminary step consisting, before producing any unambiguous path difference measurement, in performing a first rotation 40 of the host craft about the axis Z parallel to the pointing axis of the antennas as represented in the example of FIG. 7a. The first rotation 40 is performed in a first direction, for example in the clockwise direction, and has a rotation angle whose amplitude has been set in advance based on criteria specific to the mission: the amplitude must be sufficiently great to be able to perform the first unambiguous line-of-sight measurement, but must remain compatible with the rotation capability of the host craft and any stresses from its payload. No condition of prior alignment of the two host and companion craft is necessary, all that is necessary is for the triplet of antennas of the host craft to be in radiofrequency visibility of an Rx/Tx antenna of the companion craft. The first rotation 40 is performed independently or by remote control from the ground depending on the mission constraints, but in all cases following a process of acquisition and of tracking of the signals allowing the two spacecraft to be synchronized. In other words, the rotation begins when the two-way link 33 between two spacecraft is established and path difference measurements, although ambiguous, are available. As represented in the block diagram of FIG. 7*b*, during the rotation of the host craft, the host craft transmits 50 a signal on its different transmitting antennas, in the time windows which are assigned to it by the TDMA frame. The companion craft 20 acquires the signals in the time windows which are allocated to it and performs 52 path difference measurements, at different successive measurement instants t, the measurement instants following one another according to the basic period of the terminal, typically 1 second between two successive measurement instants t and t+1, then transmits the measurements performed over the inter-craft two-way link 33, to the host craft 10. On reception 53 of the measurements, throughout the duration of the rotation, the processing device 14 of the host craft computes the variations 56 of the path differences measured between the successive measurement instants and combines these path difference variations with measurements 58 of inertial attitude variations of the host craft performed at the same measurement instants t by an inertial attitude sensor 59, for example by a star sensor or any other high-accuracy inertial attitude measurement device, placed onboard the host craft. This therefore corresponds to a particular mode of operation of the device of the host craft which has to be informed by the GNC 62 via a specific means, for example a remote control, of the start of the rotation.

The combination of the radiofrequency measurements and of the inertial measurements makes it possible to obtain, unambiguously, the coordinates of the line-of-sight vector LoS in the reference frame X, Y, Z formed by the two pairs of antennas, main and secondary 11, 12 and 11, 13, of the host craft:

$$X_{LOS} = \frac{-\Delta ddm_1}{2 \cdot d_1} + \frac{-\sin\psi \cdot \Delta ddm_2}{2 \cdot (1-\cos\psi) \cdot d_2}$$

$$Y_{LOS} = \frac{\sin\psi \cdot \Delta ddm_1}{2 \cdot (1-\cos\psi) \cdot d_1} + \frac{-\Delta ddm_2}{2 \cdot d_2}$$

Using $X_{LOS}$ and $Y_{LOS}$ to denote the coordinates of the line-of-sight vector LoS at an initial instant of the first rotation 40, $\psi$ to denote the angle of the rotation performed between the initial instant and the final instant of the first rotation and measured by the inertial attitude sensor 59, $\Delta ddm_1$ and $\Delta ddm_2$ to denote the path difference variations measured on the two antenna bases of lengths d1 and d2 between the two initial and final instants. These coordinates of the line-of-sight vector LoS correspond to an estimation 60 of the relative angular position between the host craft and the companion craft.

It should be noted that the above equations are given for a triplet of antennas forming two orthogonal antenna bases, and for an inter-craft distance that is very great compared to the lengths d1 and d2 of the antenna bases. A person skilled in the art will be able to adapt these equations in the case where the two antenna bases are not at right angles, or to take into account the parallax effect when the inter-craft distance is not very great compared to the lengths d1 and d2 of the antenna bases.

Once a first unambiguous measurement of the coordinates $X_{LOS}$ and $Y_{LOS}$ has been obtained, the radiofrequency system takes care of the current measurement of the coordinates $X_{LOS}$ and $Y_{LOS}$ by measuring the variation of the inter-antenna carrier phase differences continuously, unambiguously and accurately. Ultimately, the accuracy of the current measurement is essentially that of the initial measurement.

The error on the initial measurement that is thus obtained contains several types of error components including error components specific to the radiofrequency instrumentation relating to the multiple paths caused by the reflection of the signals and to the calibration residues of the transmission and reception electronics, error components specific to the combination of the radiofrequency and inertial measurements due to the harmonization errors between the triplet of antennas 11, 12, 13 and the reference trihedron of the inertial sensor 59 and to the measurement errors of the inertial sensor 59, and an error component linked to the lateral movement of the companion craft 20 during the rotation.

The first two types of error components can be reduced by installation techniques and precautions that are well known to those skilled in the art.

The error component linked to the lateral movement of the companion craft 20, that is to say its displacement in a direction orthogonal to the line-of-sight vector LOS, cannot be completely reduced at this stage of the operations. This component can be quite significant, however, notably if the host craft rotation actuators have a moderate power, which leads to a lengthy first rotation maneuver and to the possibility of a not-inconsiderable displacement of the companion craft during this time. The difficulty in reducing this error component is due to the fact that the two host 10 and companion 20 craft are not aligned, which results in an underestimation of the lateral speed, as explained hereinbelow.

The vector V representing the relative speed of the companion craft relative to the host craft is the derivative relative to the time t of the product D. LOS between the distance D separating the two host and companion craft and the unitary vector LOS, and is given by the equation:

$$\vec{V} = d(D \cdot \vec{LOS})/dt = dD/dt \cdot \vec{LOS}$$

The lateral (or orthoradial) speed is the first term of this sum:

$$\vec{V}_{lat} = D \cdot d\vec{LOS}/dt$$

The measurement of the variation of the carrier phase differences of the antennas 11, 12, 13 of the triplet provides, accurately and unambiguously, the quantities derived from the components of the LOS vector in the reference frame X, Y, Z linked to the bases of the antennas 11, 12, 13 of the triplet, $dX_{LOS}/dt$ and $dY_{LOS}/dt$, but there is no direct measurement of $dZ_{LOS}/dt$ available. The knowledge of this third component is obtained from the norm of the unitary vector $\vec{LOS}$, the square of which is equal to 1 according to the following expression:

$$X_{LOS}^2 + Y_{LOS}^2 + Zlos^2 = 1$$

By deriving this equality, the following equations are obtained:

$$2X_{LOS} \cdot dX_{LOS}/dt + 2Y_{LOS} \cdot dY_{LOS}/dt + 2 \cdot Zlos \cdot dZ_{LOS}/dt = 0,$$

$$dZ_{LOS}/dt = -\frac{Xlos}{Zlos} \cdot dX_{LOS}/dt - \frac{Ylos}{Zlos} \cdot dY_{LOS}/dt$$

This equation shows that the error on the coordinates $X_{LOS}$ and $Y_{LOS}$, induced by the ignorance of the lateral speed of the companion craft, leads in turn to the ignorance of the lateral speed. This ignorance becomes that much lesser when $X_{LOS}$ and $Y_{LOS}$ are small, that is to say that the two spacecraft are aligned.

To resolve this problem without performing a prior alignment of the spacecraft via bi-frequency measurement signals, the invention consists in performing the first rotation 40 despite the misalignment of the spacecraft 10, 20. The invention then consists in using the approximate angular position measurement obtained at the end of this first rotation to perform 63 an approximate alignment of the two spacecraft then in performing a second rotation of the host craft about the axis Z. The second rotation is performed in a second direction, opposite to that of the first rotation, for example in the counterclockwise direction, the angle of the second rotation having approximately the same value as the angle of the first rotation. The invention then consists in repeating the above operations, which makes it possible to perform 55 a new unambiguous measurement of the angular position. The approximate alignment of the two host and companion craft performed before the second rotation of the host craft makes it possible to obtain a more accurate measurement of the lateral speed between the two spacecraft and thus a more accurate measurement of the relative angular position between the two host and companion craft because it is then corrected of the lateral movement undergone during this second rotation.

It is possible to envisage a third phase consisting in using the new angular position estimation to refine the alignment of the two craft and perform a third rotation to further refine the knowledge of the angular position. However, this third phase will prove pointless most of the time. Moreover, the impact of the ignorance of the lateral displacement on the process of identifying line-of-sight measurement ambiguities explained above arises in terms of angular uncertainty and not of absolute displacement. This impact can therefore be significantly reduced, even canceled, by sufficiently distancing the companion vehicle from the host vehicle, if this remains compatible with the constraints linked to the mission.

The invention is not limited to a configuration with two spacecraft but applies to configurations comprising a number of spacecraft greater than two. In effect, from the moment when N companion craft are visible to the triplet of antennas of the host craft, that is to say are situated in the half-space defined by the triplet of antennas, then the steps of the method for determining the relative angular position can be performed for all these N companion craft by considering the host craft and each companion craft in pairs. In this case, a single first rotation of the host vehicle leads to an approximate estimation of the relative position of the N companion craft in the reference frame linked to the host vehicle. A strategy optimizing the number of intermediate rotations and/or alignments with each companion craft complements the process of unambiguously determining the position of each companion craft. Regarding this last point, depending on the relative distancing of the different spacecraft, on the desired accuracy specifications or on the specifications of the selected signal frequency, it is possible to omit the maneuvers concerning the alignment of the host and companion craft and the second rotation of the host craft. For example, in K band, an angular solution, even biased by a few carrier wavelengths, can generally provide a sufficiently accurate positioning, unlike in the S band.

Figure 8:
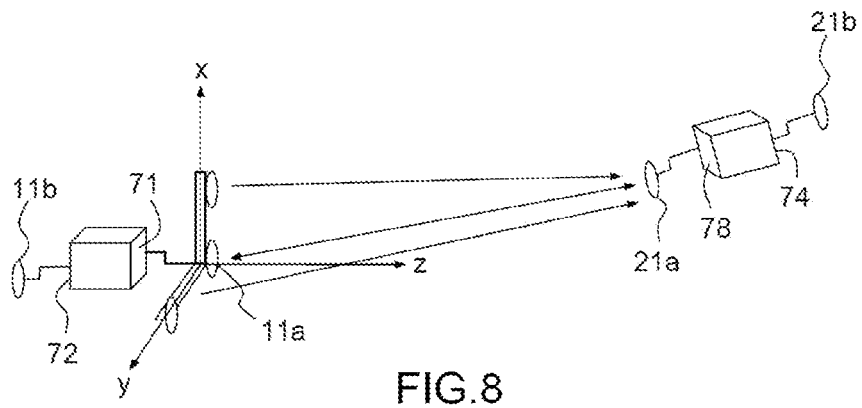
FIG. 8: an example illustrating two remote spacecraft, respectively host and companion, each spacecraft comprising two transmitting and receiving antennas on two opposite faces, according to one embodiment of the invention.

The number of antennas placed on each host or companion craft can be greater than what is explicitly represented in FIG. 1. In particular, for the reception to be possible, regardless of the orientation of the spacecraft, and to avoid the situations of blindness for which no antenna of a spacecraft is capable of receiving the signal, it is possible, for each host and companion craft, to use two transmitting and receiving antennas 11a, 11b, 21a, 21b for each craft instead of just one. In this case, the two transmitting and receiving antennas can preferably be placed on two opposite faces of each craft, as represented for example in the embodiment of FIG. 8.

The presence of a single host craft 10 comprising a triplet of antennas 11, 12, 13 is sufficient to ensure the positioning of all the spacecraft of a formation in the reference frame linked to the host craft. However, to obtain a redundancy of the measurements or improve the independence of the spacecraft, it is possible to equip each craft of the formation with a triplet of antennas similar to that of the host craft as represented for example in FIG. 9a in which the two spacecraft are equipped with a triplet of antennas on a first face and an Rx/Tx antenna on a second opposite face, according to another particular embodiment of the invention. In this case, the architecture of all of the craft is identical to that of a host craft and the processing device 14 further includes a measurement module, making it possible for each craft to be able to act as host craft or as companion craft according to requirements. The two spacecraft are then interchangeable and can become the craft bearing the reference frame of reference of the formation. When the formation is complex, that is to say when the number of spacecraft is greater than or equal to 3, the different antennas of the craft of the formation then make it possible to maintain the radiofrequency location and communication link 33 between the different craft regardless of their relative positioning.

Figure 9A:
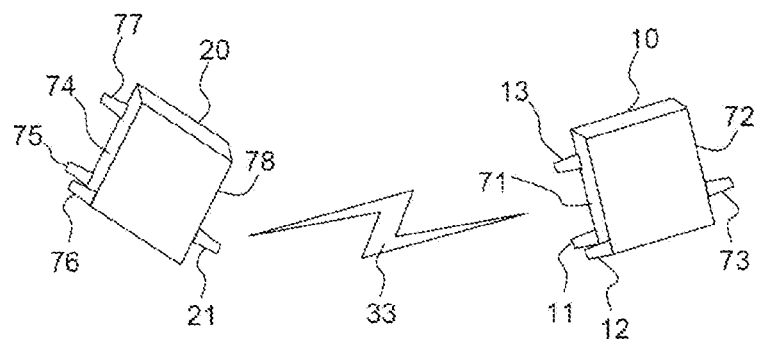
FIG. 9a: an exemplary configuration of two remote spacecraft equipped with a triplet of antennas on a first face and a transmitting and receiving antenna Rx/Tx on a second opposite face, according to another particular embodiment of the invention.
Figure 9B:
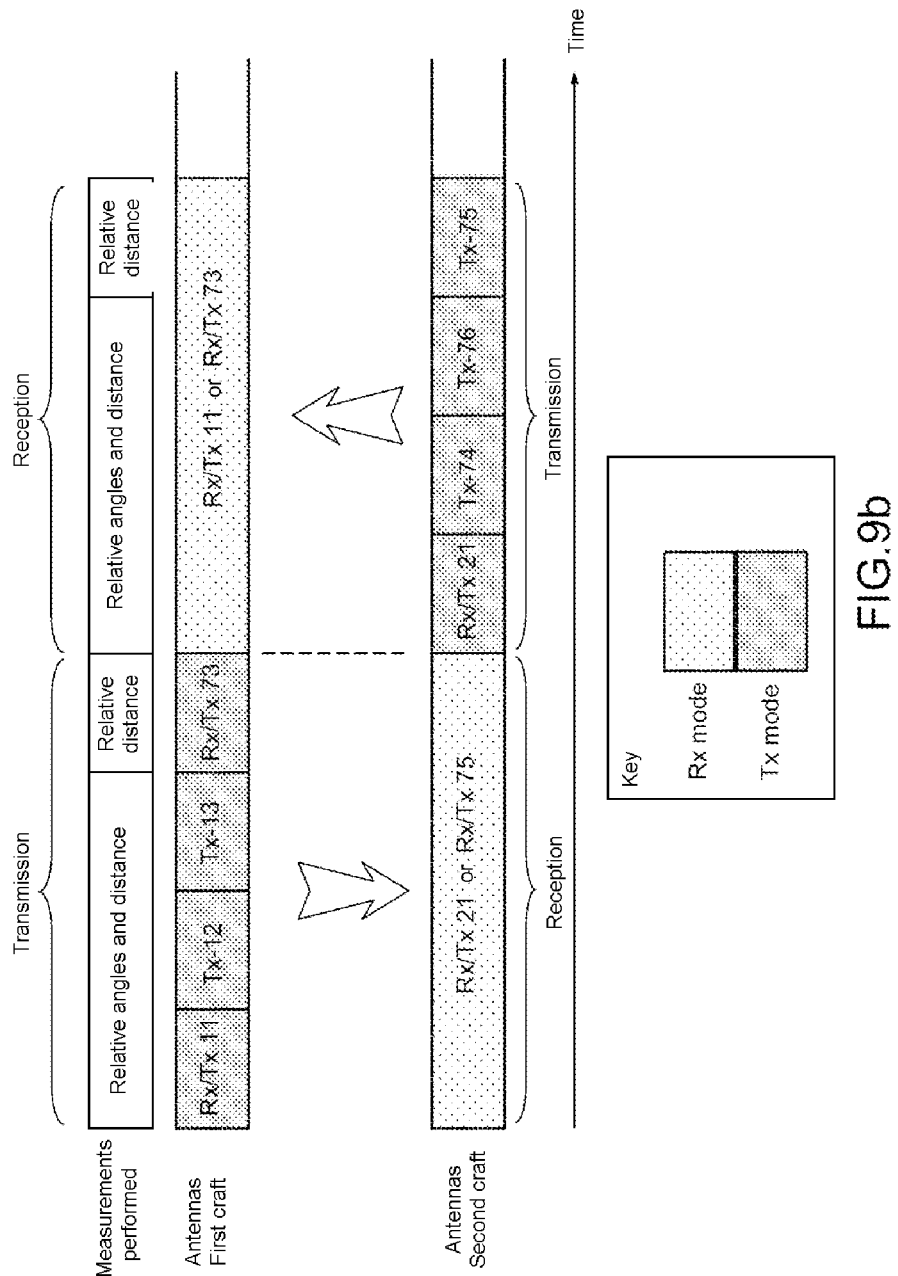
FIG. 9b: an example of TDMA frame applicable to the case of FIG. 9a, for two remote spacecraft equipped with a triplet of antennas on a first face and an Rx/Tx antenna on a second opposite face, according to a particular embodiment of the invention.

FIG. 9b shows a graph illustrating an exemplary TDMA frame which can be used to transmit and receive signals between two identical craft each comprising a triplet of antennas on a first face and a transmitting and receiving antenna on a second face opposite the first face, in accordance with a variant embodiment of the invention. The triplet of antennas mounted on the first face 71 of the first craft 10 consists of an Rx/Tx antenna 11 operating in transmission and in reception and two Tx antennas 12, 13 operating in transmission only. Furthermore, the first craft 10 comprises a transmitting and receiving antenna 73 mounted on the second face 72 opposite the first face 71. The triplet of antennas mounted on the first face 74 of the second craft 20 consists of an Rx/Tx antenna 75 operating in transmission and in reception and two Tx antennas 76, 77 operating in transmission only. Furthermore, the second craft 20 comprises a transmitting and receiving antenna 21 mounted on the second face 78 opposite the first face 74. Only the antennas pointed toward the antennas of another craft can intercommunicate. In FIG. 7, only the Rx/Tx antennas 21 mounted on the face 78 of the second craft 20 and the triplet of Rx/Tx 11, Tx 12, Tx 13 antennas mounted on the face 71 of the first craft 10 are capable of communicating via the inter-craft communication link 33. Furthermore, each craft comprises an architecture corresponding to that of a host craft and is capable of processing measurements performed and transmitted by another craft to extract therefrom an estimation of the relative angular position between the two craft. The two craft can therefore operate as host craft when the orientation of their triplet of antennas is pointed toward the inter-craft communication link 33 or as companion craft. The signals transmitted by antennas pointed in directions opposite to the inter-craft communication link 33 cannot be received by another craft. In the example of FIG. 9a the operational triplet of antennas is the triplet 11, 12, 13 placed on the first craft 10. It is therefore the first craft which is capable of processing measurements performed by the second craft 20 and of estimating the relative angular position between the two craft. However, in the case of a flight in formation for example, the triplet of antennas of the second craft 20 can be operational relative to a third craft, not represented, of the formation and be a host craft relative to this third craft.

The TDMA frame comprises a plurality of successive time windows, each time window being dedicated to the transmission or the reception of signals on a particular antenna of the first craft 10 or on an antenna of the second craft 20. The signals transmitted by each craft in turn comprise measurements and data modulated by a carrier. These transmitted signals make it possible to transmit data between the craft and to perform measurements of angles and of relative distance between the craft. The first line of the graph of FIG. 9b indicates the measurements which can be performed during the different time windows of the TDMA frame. The second line of the graph indicates the active antennas of the first craft during each time window. The third line of the graph indicates the active antennas of the second craft 20 during each time window.

When a craft transmits a signal, all the other craft are in reception mode and listen for the signal transmitted. For the reception power level to be sufficient, it is necessary for the receiving antennas of the craft which are listening to be correctly oriented relative to the antennas of the craft which is transmitting. This therefore depends on the relative orientation of the different craft. A power measurement device can be placed onboard each craft to select, in real time, the best receiving antenna as a function of the estimated power levels on each antenna. The power measurements necessary for dynamically selecting the receiving antenna are performed continuously, by following the TDMA frame, in parallel to the other measurements.

The first half of the TDMA frame corresponds to the time period allocated to the first craft 10 for the transmission. This time period comprises four time windows respectively assigned to the four Rx/Tx 11, Tx 12, Tx 13, Rx/Tx 73 antennas of the first craft 10 which transmit in turn in an order that is pre-established and a priori cannot be modified. During this period, the Rx/Tx 21 or Rx/Tx 75 antennas of the second craft 20 listen and the Rx/Tx 21 or Rx/Tx 75 antenna with the strongest power makes the measurements. The determination of the antenna of the second craft 20 that has the strongest power is performed by the first craft 10. For this, in reception, the first craft 10 performs the power measurement on the signals transmitted by the antennas of the second craft 20, then retransmits the power measurements performed over the two-way data transmission link 33. In reception, the second craft 20 selects the Rx/Tx antenna which generated the greatest power when it was transmitting. In FIG. 7, it is the Rx/Tx antenna 21 of the second craft 20 which will have the highest power level and whose measurements will be used. Furthermore, during the period of transmission of the first craft, the first craft uses the measurements which have been transmitted to it by the second craft in a preceding time window during which it was listening and determines its angular position relative to the second craft and the distance separating it from this second craft.

The second half of the TDMA frame corresponds to the time period allocated to the second craft 20 for the transmission. This time period comprises four time windows respectively assigned to the four Rx/Tx 21, Tx 74, Tx 76, Rx/Tx 75 antennas of the second craft 20 which transmit in turn in an order that is pre-established and a priori cannot be modified. During this period, the Rx/Tx 11 and Rx/Tx 73 antennas of the first craft 10 listen and the Rx/Tx 11 or Rx/Tx 73 antenna with the strongest reception power makes the measurements. In FIG. 7, only the Rx/Tx antenna 21 is correctly oriented for the signal that it transmits to be received by the first craft 10. Consequently, the first craft cannot make path difference measurements from the signal transmitted by the second craft 20. However, with the reception of a single signal, it is possible to produce ranging measurements between the two craft from the half-sum of the pseudo-distances exchanged over the two-way data transmission link 33. The half-difference of the same ranging measurements generates the inter-clock bias, necessary for the data-stamping, in local time of the host craft, of the path difference measurements performed by the companion craft.

By way of nonlimiting example, for a TDMA frame duration of 80 ms, it is possible to allocate 10 ms to each transmission time window for each of the two craft.

The invention can be applied to any set comprising at least two spacecraft for which the relative position has to be determined.

The two spacecraft can form part of a plurality of spacecraft, such as satellites flying information. In this case, the relative positioning between the craft of the formation can be performed identically for all the craft of the formation taken two by two for each pair of spacecraft, the TDMA frame then comprising additional time windows allocated to the antennas of the other craft of the formation. For N spacecraft each equipped with M antennas, the frame will comprise N×M transmission time windows. For example, for a formation of three craft each comprising four antennas, the TDMA frame must comprise 12 transmission time windows. If 10 ms is allocated to each antenna, the overall duration of the frame is then 120 ms.

The spacecraft can also consist of a cargo vehicle and a space station, the cargo vehicle wanting to be moored to the space station. In this case, the cargo vehicle must be equipped with at least one triplet of antennas and the space station must have at least one receiver provided with a transmitting and receiving antenna associated with transmission and reception means and with measurement means making it possible to perform measurements of relative position of the cargo vehicle on approach and measurements of distance between the cargo vehicle and the space station from the signals transmitted by the triplet of antennas of the cargo vehicle and retransmit the measurements to the cargo vehicle on approach.

Depending on the number of triplets of antennas that exist on the different craft, the position and the initial orientation of the different craft, there may be cases in which no triplet is in sight of at least one other craft. By virtue of the additional transmitting and receiving antenna arranged on a face opposite the triplet of antennas or previous measurements of the GNC navigation module 62, it is possible to modify the orientation of the craft(s) concerned in order to quickly replace the corresponding triplet of antennas in a favorable configuration.

Although the invention has been described in association with particular embodiments, it is obvious that it is in no way limited thereto and that it comprises all the technical equivalents of the means described and their combinations provided that they fall within the framework of the invention.

The invention claimed is:

1. A method for determining, by pairs of spacecrafts, a relative angular position of a plurality of companion spacecrafts with respect to a host spacecraft, the method comprising:
sequentially transmitting radiofrequency signal from a triplet of host antennas mounted on a first face of the host spacecraft, the triplet of host antennas comprising a main transmitting and receiving antenna and two secondary transmitting antennas, the triplet of host antennas forming two antenna baselines of a known length and orientation in a reference frame attached to the host spacecraft, the sequential transmission including connecting an electronic source of the radiofrequency signal successively to each of the triplet of host antennas during an allocated time slot of a TDMA sequence containing at least 3+N time slots, N being a number of the companion spacecrafts, the radiofrequency signal comprising at least one radiofrequency carrier modulated by signaling data necessary for TDMA synchronization, both carrier and signaling data of the radiofrequency signal being synchronized to a host clock of the host spacecraft;
receiving the radiofrequency signal on a transmitting and receiving companion antenna of at least one of the companion spacecrafts;
measuring from the radiofrequency signal, onboard the at least one of the companion spacecrafts, three ranging measurements, each ranging measurement resulting from the receiving of the radiofrequency signal during a TDMA time slot associated with one of the host antennas and representing the length of a path between the one of the host antennas and the companion antenna, the three ranging measurements being equally biased by an imperfect synchronization between the host clock and a companion clock;
computing, onboard the at least one of the companion spacecrafts, an unbiased measurement of a path difference with respect to a first antenna baseline of the host spacecraft and an unbiased measurement of path difference with respect to a second antenna baseline of the host spacecraft;
transmitting, by the at least one of the companion spacecrafts from the transmitting and receiving companion antenna to the host spacecraft, in the TDMA time slot allocated to the at least one of the companion spacecraft, a radiofrequency signal transporting the unbiased measurements of path difference with respect to the antenna baselines of the host spacecraft;
receiving, onboard the host spacecraft on the main transmitting and receiving antenna, the radiofrequency signal; and
deducing, from the measurements of the radiofrequency signals and the known length and orientation of the two antenna baselines in the reference frame, an azimuth angle and an elevation angle of the companion antenna of the at least one of the companion spacecrafts with respect to a reference frame attached to the host spacecraft.

2. The method of claim 1, wherein all the radiofrequency signals transmitted or received are modulated by an identical frequency carrier F1.

3. The method of claim 2, further comprising: performing a first rotation of the host spacecraft about an axis Z parallel to a pointing axis of the triplet host antennas, the first rotation being performed in a first direction and having a rotation angle of a predetermined value;
acquiring measurements of path differences, at successive measurement instants during the first rotation;
computing path difference variations between the successive measurement instants;
measuring variations of inertial attitude of the host spacecraft at each successive measurement instant to determine the relative angular position between the host spacecraft and each companion spacecraft;
performing a second rotation of the host spacecraft about the axis Z to align the host spacecraft and each companion spacecraft, the second rotation being performed in a second direction opposite the first direction and having a rotation angle of a value substantially identical to the first rotation; and
performing a new measurement of the relative angular position between the host spacecraft and each companion spacecraft.

4. A system for determining, by pairs of spacecraft, a relative angular position of a plurality of companion spacecraft with respect to a host spacecraft configured to implement the method according to claim 1, the system comprising a host spacecraft and a companion spacecraft, wherein:
the host spacecraft comprises:
at least one triplet of host antennas mounted on a first face, the triplet of host antennas comprising a main transmitting and receiving antenna and two secondary transmitting antennas, the triplet of host antennas forming two antenna baselines of known length and known orientation in a reference frame attached to the main craft,
a transmission chain configured to be successively coupled, in transmission, to each host antenna of the triplet of host antennas,
a reception chain configured to be coupled, in reception, to the main antenna,
a radiofrequency switch configured to sequentially select different host antennas of the triplet of host antennas, and
a processing device configured to determine azimuth and elevation angles of companion antenna of the companion spacecraft with respect to the reference frame linked to the host spacecraft from measurements of path differences transmitted by the companion spacecraft, and
the companion spacecraft comprises:
at least one transmitting and receiving antenna placed on a first face,
a transmission chain and a reception chain respectively coupled to the transmitting and receiving antenna, and
a measurement device configured to measure path difference with respect to the first antenna baseline of the host spacecraft and path difference with respect to the second antenna baseline of the host spacecraft.

5. The system according to claim 4, wherein each of the host and companion spacecrafts further comprises a second transmitting and receiving antenna placed on a second face opposite the first face of the host and companions spacecrafts.

6. The system according to claim 5, wherein each host and companion spacecraft comprises a triplet of antennas, a processing device and a device for measuring path differences.

7. The system according to claim 5, further comprising, onboard each host and companion spacecraft, means for measuring the power level of the radiofrequency signal received by each transmitting and receiving antenna and means for selecting the transmitting and receiving antenna that has the greatest power level.

8. The system according to claim 4, wherein the host spacecraft further comprises a device for measuring attitude variations of the host spacecraft.

* * * * *